(12) United States Patent
Ustick

(10) Patent No.: X8625
(45) Date of Patent: Feb. 5, 1835

(54) STRAW CUTTER

(76) Inventor: Stephen Ustick

Stephen Ustick
Patent for a Strawcutter

The Schedule referred to in these Letters Patent and making part of the same, containing a discription in the words of the said Stephen Ustick himself, of his improvement in his Strawcutter, for which he obtained from the United States Letters Patent bearing date October 3rd. 1834.

To all to whom these Presents shall come

Be it known, that I, Stephen Ustick of Philadelphia, in the county of Philadelphia, and State of Pennsylvania, have invented a new and useful improvement on the Strawcutter, for which I obtained Letters Patent, from the United States, bearing date Octob 3rd 1834, a Schedule of which is given below, and that the specification ~~given~~ succeeding said Schedule, is a full and exact description of the construction and operation of the said improvement as invented by me:

Schedule referred to above – To all to whom these Presents shall come, Be it known, that I Stephen Ustick of Philadelphia, in the county of Philadelphia and State of Pennsylvania, have invented a new and useful improvement on the Straw-cutter for cuting straw, hay, & cornstalks, called Stephen Usticks Straw Cutter, and that the following is a full and exact descrip-tion of the construction and operation of the said machine as invented by me – ?

In the first place I have a frame constructed as follows – two posts, which I call the front trough posts, are framed into a base, one foot asunder, said basepiece ex-tends beyond the right hand post, and has a post, which I call the first crankpost, framed into it 6 inches from said post the first crank post is framed at top into one end of a rail, which is framed at its other end into the right hand trough post above specified – This rail serves as a foundation for a gudgeon box of the crank which is described below. The other gudgeon box of the crank rests on the cap of a post, which I call the second crank post, which is in front of the first one, and connected with it by 2 rails, one near the bottom of the posts, and the other so far below the top, as to allow the crank below specified, to work above it. There are 2 posts which I call the backtrough posts, framed into a base of the same, distance asunder as the front trough posts, and are connected above by a rail, on which the back end of the bottom of the trough is nailed. The backtrough posts are framed below on one end of two rails which are framed at their other end into the front trough posts – The sides of the trough are framed into the front trough posts at one end, and nailed at their other end, on the inside edges of the backtroughposts, the said posts being cut out the thickness of the sides to receive them. The bottom of the trough is in a horizontal position lengthwise the right hand edge is one inch lower than the left hand one; it extends from the back of the trough to a fluted cast iron feed roller in front; whose gudgeons turn in the sides of the trough, just behind the trough posts. This top of said roller extends 1, inch above the bottom of the trough – The sides of the trough are tapered from the said feedroller to their back end to make the trough wider behind than before – This trough is only 2 feet long – I extend the trough 2 fts 6 inches further, by having a separate trough to fit at front, to its back and fastened thereto, by having strips of iron fastened on the top edges, at front which extend over the tops of the back trough posts and fit by means of holes in their front ends on iron pins, which are permanent in the ends of the posts, and by strips nailed on the back of the first trough, at the sides and bottom. – The trough is made in two pieces, as described above, for the purpose of the backpart being taken off when the machine is not in use, so that the machine may then take up but little room.

There is an opposing edge fastened on the mouth of the trough by means of screws; it consists of a bottom & 2 uprights therefrom - The screws are in the uprights - The top of the bottom part of said edge ranges with the top of the feedroller above specified and is of the same height. There is a strip of iron extending from it to the roller in a des- cending position which serves to guide the straw in front of the roller over the opposing edge. There is another feedroller like the above over it - It is in a horizontal position, lengthwise, and its gudgeons work in a frame whose uprights work between the front troughposts and strips, which are fastened to the sides of the trough The uprights have a rail at top above the roller, and one at bottom which is near the bottom siderails - There are two springs, one to each side of the said frame, which are fastened at one end, to the bottom siderails of the machine - their other ends bear on the bottom rail of the roller frame - They are to incline the upper roller towards the lower one, to compress the straw.

There is a cast iron frame with a short tongue at each corner. The tongues slide in cast iron groove inserted in edges of two rails which are fastened on the front of the machine, by means of screws or bolts - Said rails are in an oblique position, and may be more or less oblique, running downward from the right side of the Machine. There is a Knife at the backside of said frame in such a position with it as to be parallel with the top feedroller - The back edge of it comes against shoulders of the frame, each end at the bevel side rests on two screws which run through the frame - There is one screw at each end of the Knife, in a counter position with the above and between them - The heads of these are countersunk in the face of the Knife, they have taps on their tail ends, which bear against the face of the frame - The use of the first described screws is to regulate the set of the Knife - The Knife frame vibrates by means of a crank and Pitman - The Pitman is connected with the frame by a pivot which is fastened in the lower corner of the latter. There is a balance wheel on the frontend of the crank, which has a handle in one of its arms by which the crank is turned - In the drawing [illegible]

motion of the Knife frame; the Knife cuts the straw, when it has nearly returned, the straw is fed by means of a slope Knob of the lower end of the frame working against the front end of the horizontal shaft, which work in boxes that are screwed to the trough posts of that side of the machine, there being a catch hung on the inside of said shaft which operates on a ratchet wheel of the bottom roller and one hung to an upright of said shaft operates on a ratchet wheel of the top roller. The upper catch is above its ratchet wheel, the lower one is below its ratchet wheel, it is kept up against the ratchet wheel by its tail end being heavier than its bill part. The top roller is kept from turning backward, by means of two palls hung on the upright of the roller frame, operating on the ratchet wheel. The bottom roller is kept from turning backwards, by two palls hung on the [illegible] strip of the roller frame at that side of the machine. The upright of the roller frame has a slit in it, which works over the gudgeon of the bottom roller on which the ratchet wheel is. As the Knife goes down, the catch shaft above described slips forwards by means of a half circle spring, whose tail bears against the [illegible] of the catch shaft. The feed of the roller is regulated by a flat head screw in the back end of the catch shaft, which slides in the hole of the plate fastened on the trough post. The head of said screw coming against the plate prevents the catch shaft above described being pushed too far forward by the spring described above.

There is a board, with the grain of the wood running perpendicular, fastened to the upper rail of the roller frame above described in front of the upper roller, extending to within 1/2 inch in height of the bottom of the roller. Its face is nearly as far in front as the opposing edge. The use of it is to prevent the straw from being raised by the Knife in its upward motion.

By the position of the Knife and the opposing edge with the rollers, and the direction of the Knife frame as described above I get a much greater draw of the Knife on the straw than can otherwise be obtained with a crank of equal length, which makes it cut
much easier.

What I claim as my invention, is the arrangement of the bottom
of the trough, the opposing edge, the feedrollers, the position of the knife
and the direction of the knife frame collectively and the general [illegible]
tion of the Machine as described above.

In testimony, that the above is my invention, I have hereunto
affixed my hand this nineteenth day of September, in the year of
our Lord, One thousand, eight hundred and thirty four.

Witnesses
John Binns }
Allen Ward }

Stephen Ustick

The improvement for which [illegible] solicit Letters
Patent, consists in apparatus for feeding and compressing the [illegible]
in lieu of that described in the above Schedule and which is of the fol-
lowing construction.

There is a groove in each side of the front trough within
one inch of the bottom edge, the top edge of which ranges with the oppo-
sing edge. The bottom of the trough consists of three pieces of board the
grain of which runs crosswise, fit in said grooves. The first of said
pieces is 6½ inches wide, the second, which I call the lower feeder
8 wide, and the third commences within 6½ inches of the first and
extends to the back of the trough. The first and third are station-
ary, but the second one, or lower feeder is [illegible] backwards &
forward in the grooves described above, as described below.
There is a piece of sheetiron screwed on the face of said feeder,
at the front edge, which extends over the back edge of the first
piece of bottom, and there is a similar piece attached in the same
manner to the third piece, which extends over the back edge of the
feeder. They are to break the spaces in front and back of the feeder,
to prevent the straw from catching therein as the feeder vibrates.
There is a perpendicular frame, whose base is [illegible] on blocks on the lower side of the above specified feeder, and whose uprights are outside of the trough sides, and which extend one foot above them; in each of which there is a groove extending from 1/4 of an inch of the side upward. The upper rail of the frame is framed behind said grooves. There is a board which I call the upper feeder, one foot wide; whose ends for 3 in. from its upper edge slide in said groove. The lower part of the ends is cut out, to allow the feeder to descend in the trough. There is a box on the face of said feeder, which holds sand, or gravel, to compress the straw between it and the lower feeder. The feeder forms one side of the box *

There is a square frame, which I call the compressor, whose uprights have tongues on them, which slide in grooves of the front trough posts. Said tongues extend below the bottom rail of the compressor, and through the ends of the front piece of trough bottom, so that as the compressor is elevated, as is described below, the grooves below the lower rail of it are still filled, to prevent straw from working in them. The face of the compressor is flush with the face of the posts. The bottom rail of it, is 4 inches deep and 3 inches thick; it extends at the ends over the uprights between the posts.

There is a strip of cast iron 1 1/2 inches wide, with edges on its face formed by square edges in front and bevel sides back ward therefrom inserted in the face of the lower feeder at its front and a similar one one inch wide screwed on the lower edge of the upper feeder.

~~There is a strip of cast iron [illegible] inches wide with [illegible] on its face formed by square edges in front and bevel sides backward therefrom, inserted in the face of the lower feeder at its front and a similar one, one inch wide screwed on the lower edge of the upper feeder~~ Repetition There is a cast iron wheel with a groove on each side near its periphery, which fits eccentrically on the square of the tail end of the crank specified in the above schedule which works a lever,

United States Patent

Patent No.: X8625 which is hung on a pin in the backside of the second trough post, a [illegible] the
trough. The lever is connected with the wheel by means of pins, [illegible] el-
bows on the sides of the former, working in the graves of the latter:
As the knife is elevated, the compresser is also elevated, by means of
its being coupled with the above specified lever, by a shaft [illegible]
works on a pin in the back of the lower rail of the former, a [illegible]
through a perpendicular mortice of the latter; there being a [illegible] in
the upper end of the shaft to prevent the lever from giving the com-
presser a downward motion, but which is given to it by a spring
which bears on the upper end of a shaft which passes through a
cap rail of the front trough posts, and bears with its lower [illegible]
in a mortice of the top rail of the compresser. The ends of the shaft
are rounded to allow it to shift its position, to suit the changes
of the spring. The upper end is rounded each way, and the spring
has a counterhollow, to prevent its slipping off. The heel of [illegible]
spring is screwed to the cap rail. As the compresser descends the
upper feeder ascends by means of a chain being attached at [illegible]
end to it, and hung on a pulley in an arm from the cap rail
above specified, and attached at the other end to the lever. When
the compresser is up, the feeders are moved forward, and [illegible]
push the straw forward and when down they are pushed backward
for another action on the straw, by an upright of a crank, [illegible]
in a mortise of the front end of an iron [illegible] which is screwed
on the lower side of the lower feeder. The crank works in [illegible]
which are screwed on the side rails of the machine. There is a [illegible]
of the crank which extends towards the back of the machine [illegible]
its extremity crooked upwards, and which [illegible] with a horizontal
mortice on a pivot, through a mortice of a horizontal lever, which
works on a pivot in the outside edge of the back trough post.
The handle of this lever is operated upon by the first described
lever, it being connected therewith by means of an upright [illegible]
whose ends are in mortices of the levers on pivots through the
cheeks of the mortices, the upper end of the said shaft has a slot in it, in which the pivot of the lever slides until it has nearly got to each extreme point.

There is a screw through the base of the frame in which the upper feeder slides, with its tail end against the upright of the feeder crank, the turning of which gives more or less motion to the feeders, as may be required. the hole in the plate in which the upright works being long enough to allow some play of the latter.

* Instead of the said feeder and frame, there may be a square frame, with its stiles sliding against the blocks on the outside of the trough sides, at each edge, the bottom rail is below, and the top rail above the trough, and a sand box, which fits inside of the trough, with its top fast to the lower edge of the top rail of said frame. There is a strip [illegible] thick, and 3 inc. wide, screwed to the lower side of the lower feeder, there being blocks on the former to [illegible] the trough. There are upright grooves in the ends of said strip, in which the stiles of the frame slides. The frame is kept in a perpendicular position by two strips, one each side of the lower rail and fastened to the strip described above, and near the upright of the feeder crank. The regulator is [illegible] in the strip as in the [illegible] of the frame of the upper feeder first described.

What I claim as my invention, is the sliding bottom denominated the [illegible] [illegible] the general construction of the feeding apparatus [illegible] described above.

In testimony that I claim the above as my invention I have hereunto affixed my hand this 21st day of January, in the year of our Lord One thousand Eight Hundred and Thirty five.

Witnesses
John Burns
Thos. Burd

Stephen Ustick

[illegible] of 2[illegible] 1839 [illegible]

Rec'd Apl. 17, 1842 [illegible]
Recorded [illegible]